US006857952B2

United States Patent
Tomcak et al.

(10) Patent No.: US 6,857,952 B2
(45) Date of Patent: Feb. 22, 2005

(54) METHOD AND APPARATUS FOR TRANSPORT OF A PROBE FOR A MEAT CLASSIFICATION SYSTEM

(75) Inventors: Jason William Tomcak, Sioux City, IA (US); Francois Beaumont, Quebec (CA)

(73) Assignee: Tyson Fresh Meats, Inc., Springdale, AR (US)

( * ) Notice: Subject to any disclaimer, the term of this patent is extended or adjusted under 35 U.S.C. 154(b) by 0 days.

(21) Appl. No.: 10/709,494

(22) Filed: May 10, 2004

(65) Prior Publication Data

US 2004/0198208 A1 Oct. 7, 2004

Related U.S. Application Data

(62) Division of application No. 10/152,264, filed on May 21, 2002.

(51) Int. Cl.[7] .............................................. A22C 17/04
(52) U.S. Cl. ........................ 452/134; 452/171; 452/177
(58) Field of Search ................................. 452/125, 127, 452/134, 135, 150, 171, 177, 179, 180

(56) References Cited

U.S. PATENT DOCUMENTS 5,094,650 A * 3/1992 Schmidt ...................... 452/161

FOREIGN PATENT DOCUMENTS

| EP | 0550379 | * | 7/1993 |
| JP | 63-39536 | * | 2/1988 |

* cited by examiner

Primary Examiner—Peter M. Poon
Assistant Examiner—David J Parsley
(74) Attorney, Agent, or Firm—Blackwell Sanders Peper Martin LLP; Mark E. Stallion (57) ABSTRACT

An apparatus and method for classification of a meat cut based on the thickness of the fat layer. The meat classification system comprises a split dual-belt conveyor system and a probe/trolley mechanism assembly where the probe is operable to penetrate the meat cut for measuring fat thickness as the meat cut is being conveyed along the dual belts.

2 Claims, 12 Drawing Sheets

METHOD AND APPARATUS FOR TRANSPORT OF A PROBE FOR A MEAT CLASSIFICATION SYSTEM

CROSS REFERENCE TO RELATED APPLICATIONS

This patent application is a divisional application of U.S. patent application Ser. No. 10/152,264 filed May 21, 2002, currently pending.

BACKGROUND OF INVENTION

1. Field of Invention

This invention relates generally to classification of a cut of meat based on the thickness of the layer of fat on the meat and, more particularly, to determining the thickness of the layer of fat on a meat cut and providing the thickness information to a downstream fat trimming operation.

2. Background Art

During production processing of animal carcasses, the carcass is separated or disassembled down to its primal and sub primal cuts of meat. Many of these cuts of meat have undesirable layers of fat attached to the lean portion of the meat cut. It is typical during the dressing of a meat cut to trim away the undesirable layer of fat. This fat trimming operation is particularly common during the production processing of a pork carcass when dressing the loin portion sub primal cut of the pork carcass. The pork carcass, as with other animal carcasses, is typically separated down the back bone into two halves and then disassembled to its primal and sub primal meat cuts such as the loin portion. The loin portion of the carcass comprises a portion of the back bone, ribs, meat or lean, and an outer layer of fat. This outer layer of fat is typically separated from the meat or lean portion of the loin.

This trimming operation can of course be performed by a person utilizing a knife. However, a person utilizing a knife has difficulty in discerning the thickness of the fat layer in order to efficiently and effectively trim the fat from the cut of meat. To solve this problem automated machines or sensors have been developed for measuring the thickness of the fat layer and this measured thickness data can be provided to an automated fat trimming system for performing a subsequent fat trimming operation. The process of measuring or sensing the fat thickness for subsequent fat trimming is clearly disclosed in U.S. Pat. No. 4,979,269 issued Dec. 25, 1990 to Norrie and in U.S. Pat. No. 6,277,019 issued Aug. 21, 2001 to Veldkamp et al.

It is clear from Norrie and Veldkamp that there are various methods to sense or determine the thickness of the layer of fat on a meat cut such as capturing an image of the cut of meat with a camera or other image capturing device from a perspective where the thickness can be discerned and analyzing the image. Another common and possibly more effective method is to penetrate the meat cut with a probe operable to sense the fat thickness as the meat cut travels along a conveyor. However, in order to physically penetrate the meat cut with a probe as it is being conveyed, typically the conveyor stops or indexes while the probe is being inserted. This stopping or indexing action performed in order to probe each meat cut slows down the operation to an unacceptable pace. It is desirable to be able to probe the meat cut as it is being continuously conveyed without indexing or stopping the meat cut item. The present invention addresses this problem as well as other problems.

SUMMARY OF INVENTION

The present invention is a meat cut classification method and apparatus for sensing the thickness of a layer of fat on a cut of meat as it travels along a conveyance and providing the fat thickness or classification information to a downstream system for performing a fat trimming operation. The meat cut classification system comprises a split/dual-belt conveyor having split dual belts proximately spaced apart extending in the same direction and having a uniform equidistant gap there between and said conveyor having a drive for conveying the meat cut through the classification system and a probe/trolley mechanism assembly operable to position the probe between the dual belts of the conveyor and extend the probe upward between the dual belts to penetrate the meat cut for measuring the fat thickness. The probe/trolley mechanism assembly is further operable to translate the probe in a direction and at a velocity that is synchronized with the direction and velocity of the dual-belt conveyor. This can be achieved by using the same drive for the conveyor and the trolley mechanism.

The meat cut classifier can be positioned such that the dual-belt conveyor can receive incoming meat cuts from an upstream conveyor or other input means. The classifier system can have a sensor operable to sense when the first end of the meat cut arrives on the dual belts. When the first end is sensed the probe/trolley mechanism is translated from the home position to a position below the meat cut being conveyed through the classifier and the translation direction and speed is synchronized with that of the conveyor prior to vertically extending the probe for insertion into the meat cut. Synchronizing the velocity of the conveyor and the probe/trolley mechanism can be accomplished by clutch and chain mechanism with a cam follower. The clutch engages the conveyor drive which maintains a constant speed between the conveyor and the trolley.

The probe can be an elongated instrument having a somewhat pointed end portion such that when it is pressed against the meat cut penetration occurs into the fat layer and extends through the fat to lean transition. The probe can be instrumented with a sensor that can determine when the probe extends through the fat to lean interface as well as instrumented with a linear encoder for sensing the amount of extension of the probe or the fat layer depth. The probe is further operable to send a signal representative of the fat thickness.

These and other advantageous features of the present invention will be in part apparent and in part pointed out herein below.

BRIEF DESCRIPTION OF DRAWINGS

For a better understanding of the present invention, reference may be made to the accompanying drawings in which.

DETAILED DESCRIPTION

According to the embodiment(s) of the present invention, various views are illustrated in FIG. 1–7 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention, comprising a classification station further comprising a split dual-belt conveyor and a probe/trolley mechanism assembly with a clutch and cam follower mechanism, teaches a novel apparatus and method for classifying a meat cut. The classification station is downstream from a conveyor system operable to feed meat cuts to the classification station for classification of the meat cut based on the thickness of the fat layer. The split dual-belt conveyor of the classification station is positioned for receiving a meat cut from an upstream conveyor feed system onto the dual-belts of the conveyor system. The feed system can be any appropriate conveyance means such as a conveyor belt.

When the meat cut is received on the dual-belts the meat cut is conveyed upstream along the path of conveyance to a point where it is detected by a sensor. When the meat cut is detected the probe/trolley mechanism assembly is activated to begin travel along the same path of conveyance of the meat cut in order to position the probe for penetration and sensing of the fat layer. The probe/trolley mechanism travels from its home position along the path of conveyance until it reaches a constant speed or enters a constant speed zone at which time the constant speed or entry into the constant speed zone is sensed and the data acquisition sequence begins. The data acquisition sequence begins by activating the probe to elevate upward until penetration of the meat cut is achieved. A cylinder having an encoder drives the probe shaft in and out of the meat cut. The encoder monitors and reports the level of elevation of the probe or depth of penetration into the meat cut. Further upstream a sensor detects the position of the probe/trolley mechanism once the probe/trolley mechanism has traveled a predetermined distance along the path of conveyance and the sensor generates a trolley end of travel detection signal. This detection signal triggers the end of the data acquisition sequence at which time the probe is actuated to retract from the meat cut ending the data acquisition sequence upon full retraction. During the data acquisition sequence, data can be gathered during the upward stroke of the probe or penetration as well as during the downward stroke of the probe or retraction. The probe/trolley mechanism is then returned to its home position and arrives at a stop.

Figure 1:
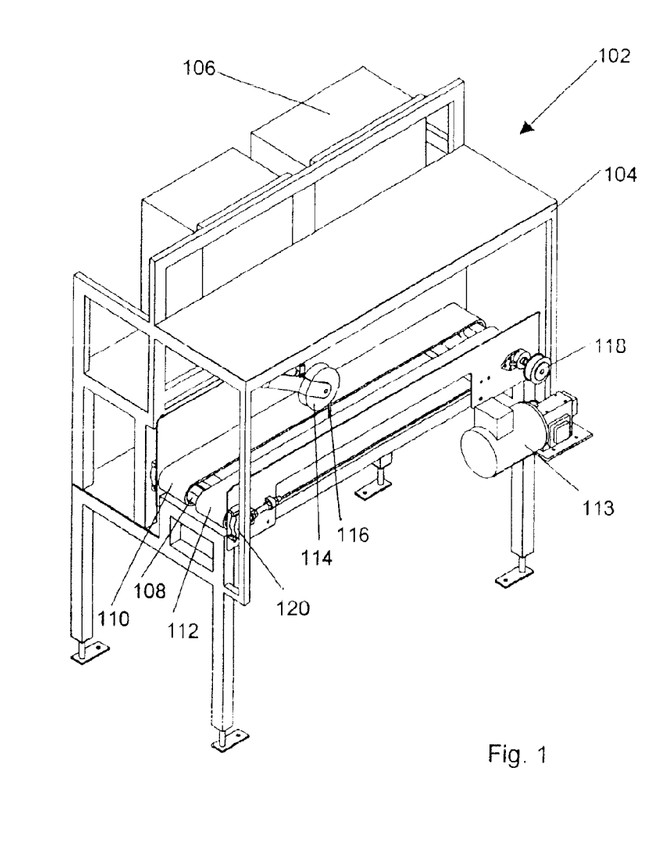
FIG. 1 is a left-front isometric view of the classification station showing the classifier system's split dual-belt conveyor with drive and the stabilizing roller.

The details of the invention and various embodiments can be better understood by referring to the figures of the drawing. Referring to FIG. 1, a left front isometric view of the classification station 102 is shown comprising the classifier system's split dual-belt conveyor system 108 having first and second dual-belts 110 and 112. The take up bearing 120 for the conveyor is also shown. The split dual-belt conveyor is driven by a drive motor 113. The split dual-belt conveyor system is shown mounted on a classification station frame 104. Also mounted on the classification station frame is a controller unit 106. The controller unit contains a PLC or other computing means. The PLC performs all main electrical control and processes all data gathering functions of the machine. Inputs include: Encoder Position, Fat/Lean Interface, Product Present Sensor. The PLC also has the ability to communicate this data to other equipment. As a meat cut is conveyed along the path of the conveyance during the data acquisition sequence a roller mechanism 114 can be lowered to apply a downward pressure against the meat cut in order to facilitate penetration of the probe 116. The downward pressure applied by the roller 114 may be necessary to hold the meat cut down as the probe is elevated upward pressing against the meat cut. The weight of the meat may not be adequate to hold position, therefore the downward pressure can be applied.

Figure 2:
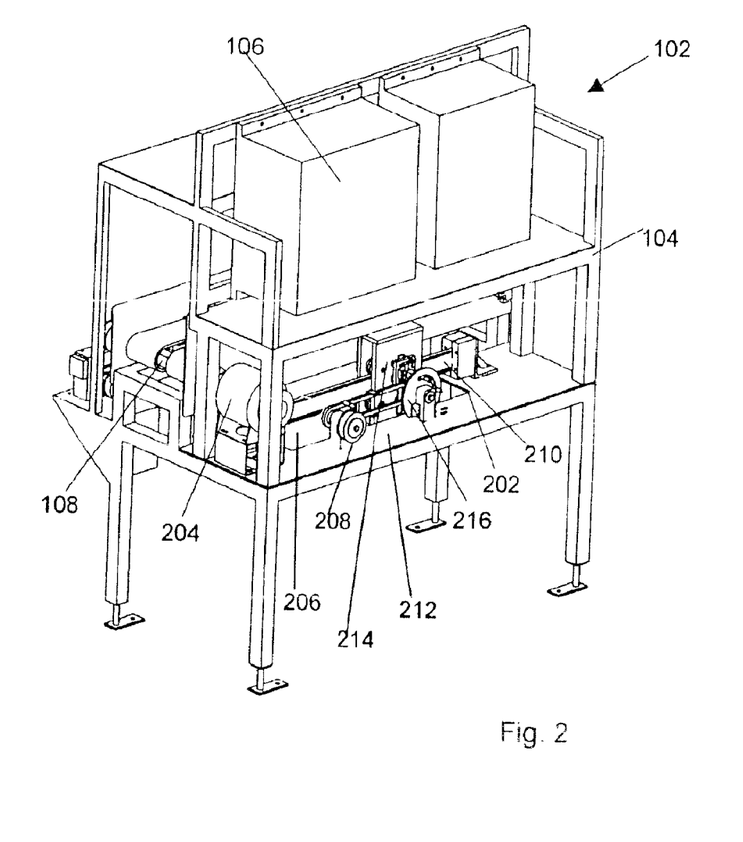
FIG. 2 is a right-rear isometric view of the classification station showing the classifier system's probe/trolley mechanism assembly with a clutch.

Referring to FIG. 2, a right rear isometric view of the classification station is shown comprising the classifier system's probe/trolley mechanism assembly 202. When a meat cut is sensed the clutch 204 is engaged to drive belt 206 and drive wheel 208 in order to drive the trolley chain. The trolley chain is operably connected to the probe/trolley mechanism assembly to effect linear motion of the assembly and the probe attached thereto along v-rail 210. The v-rail shown can by any other appropriate guide member or guide means. The assembly is aligned such that the probe travels along the path of conveyance. The linear translation is determined by the v-rail 210 on which the assembly travels. When the assembly has traveled a predetermined distance the clutch 204 is disengaged in order to halt the drive being transferred to the trolley chain. Also shown in this view is a sensor mounting plate 216 where sensors are mounted that are operable to detect the position and/or speed of the probe/trolley mechanism assembly. The plate has adjustment slots for repositioning the plate and the sensors. Any appropriate sensors well known to those in the art can be utilized to sense to position and/or speed of the trolley. The sensed data can be forwarded to the controller where it can be determined if the trolley speed is synchronized with the conveyance speed. This data is useful to indicate when the controller should activate insertion and retraction of a probe. These sensors can be referred to as speed synchronization sensors.

Figure 3:
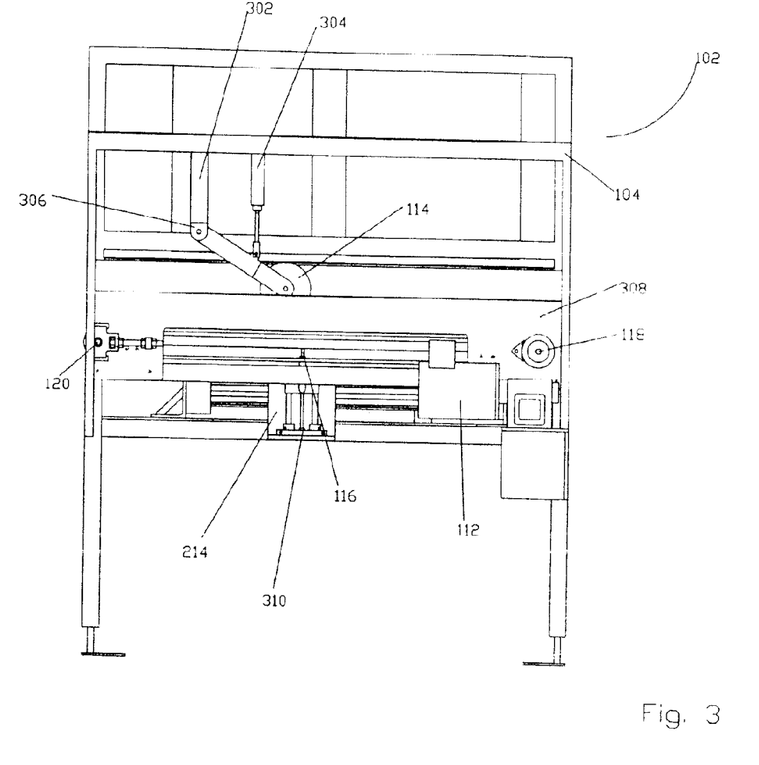
FIG. 3 is a front view of the classification station.

Referring to FIG. 3, a front view of the classification station is shown. The conveyor is shown having a guard plate 308. The side view reveals the encoder actuation cylinder assembly 310 which is operable to elevate the probe assembly upward such that the end of the probe presses against the meat cut. The probe assembly 214 comprises a probe 116 as well as an encoded cylinder and probe electronics. The probe assembly travels forward and in reverse along the path of conveyance and is held in place by cam followers and a rail. The probe assembly is positioned such that the probe when elevated upward extends upward between the split dual belts.

This side view further reveals the stabilizing roller assembly comprising the stabilizing roller 114 which is rotatably attached by an axle to a jointed two member arm 302. Joint 306 of the two member arm provides a pivot point about which the two members of the arm flex. Cylinder 304 is operably attached to one member of the two member arm that is attached to the stabilizing roller 114. The cylinder is extended and retracted in order to lower and raise the arm member attached to the roller by flexing about the pivot to thereby lower and raise the stabilizing roller respectively thereby applying pressure and relieving pressure being applied to a meat cut. Pressure from the roller is applied when the probe is being inserted. When a meat cut leading edge is detected by a meat cut present sensor and the probe assembly has reached constant speed as determined by a speed synchronization sensor, the stabilizing roller cylinder is actuated thereby lowering the roller to apply a downward pressure as the probe assembly cylinder is actuated to elevate the probe and to press against the meat for penetration.

Figure 4:
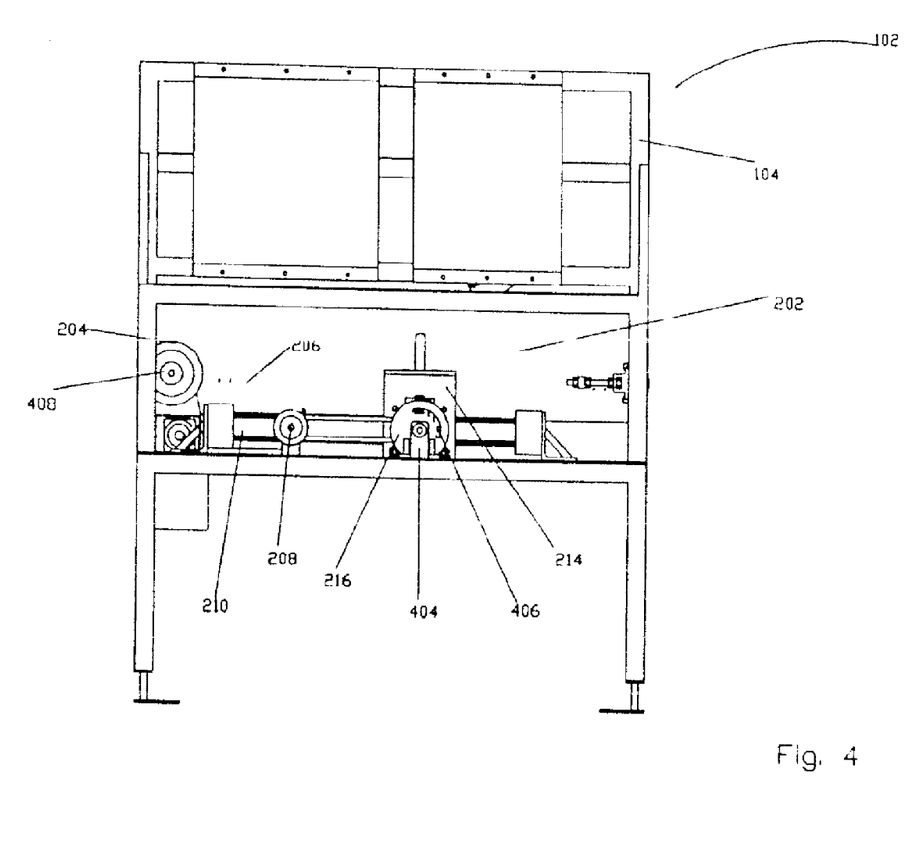
FIG. 4 is a rear view of the classification station.

Referring to FIG. 4, a rear view of the classification station 102 is shown. This view reveals the clutch 204. When the clutch 204 is engaged the primary wheel drive 408 is powered thereby powering belt 206 to transfer power to the secondary wheel drive 208. The wheel drive 208 in turn drives the roller chain which effects movement of the probe assembly 214. The entire probe/trolley mechanism assembly 202 is shown mounted on the station frame 104. The v-rail 210 is also mounted on the station frame 104. The probe assembly translates back and forth on the v-rail 210, as controlled by the trolley chain. The sensor plate 216 is also shown having a slot 406 providing for adjustments in position of the plate and sensors. When a sensor detects that the probe assembly is approaching the end of the constant speed zone at which time a signal is sent to the controller for disengaging the clutch 204.

Figure 5:
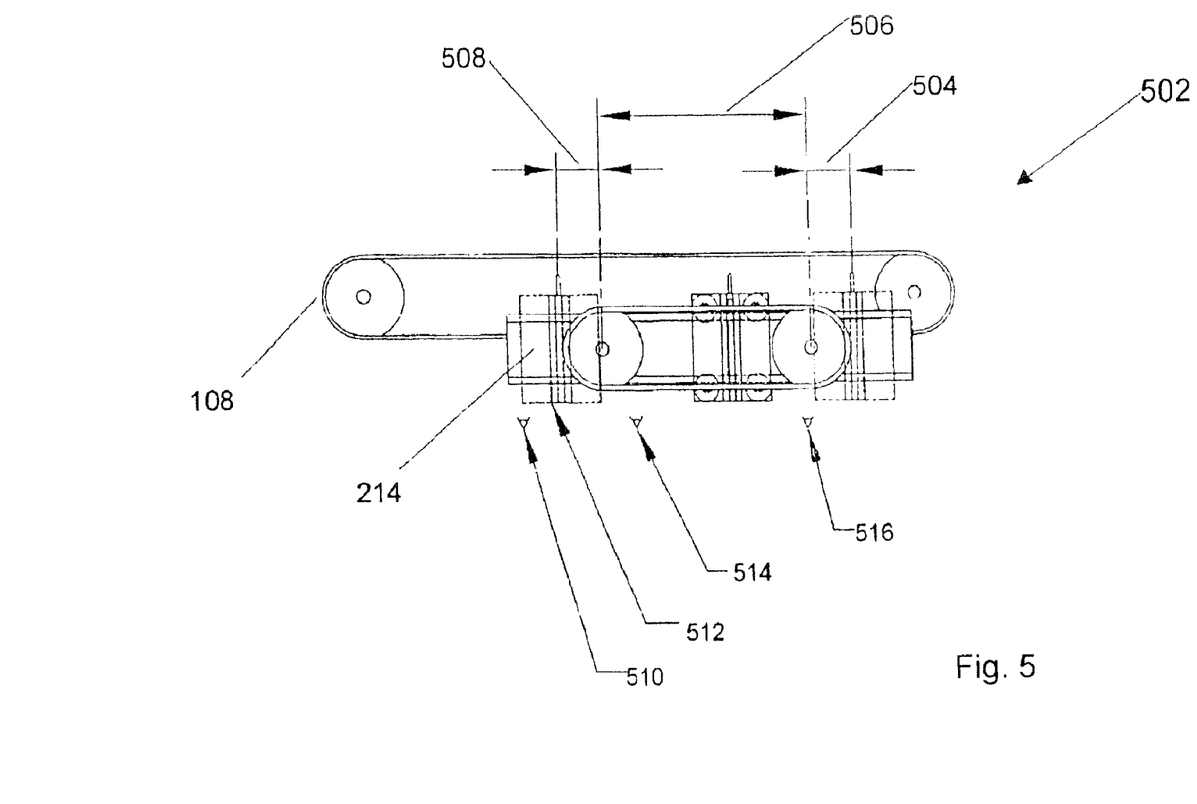
FIG. 5 is a rear illustrative view of the conveyor and probe/trolley mechanism assembly with one of the dual belts cut-away and other components cut-away for illustrating the movement and operation of the probe relative to the conveyor.

Referring to FIG. 5, a rear illustrative view of the conveyor and probe/trolley mechanism assembly with one of the dual belts cut away and other components cut away for clarity is shown. This view illustrates the movement and the operation of the probe assembly relative to the conveyor. This view illustrates the home position sensor 510, the start probe penetration sensor 514 and the start probe retraction sensor 516. The home position sensor 510 senses when the probe assembly 214 is in its home position 512 and ready for the next incoming meat cut. The start probe penetration sensor 514 senses when the probe assembly is in position to begin probe penetration that is in the constant speed zone 506. The start probe retraction sensor senses when the probe assembly is in position for retraction of the probe that is as the probe assembly 214 approaches the end of the constant speed zone 506. Probe penetration and probe retraction is performed during the constant speed zone 506. Probe penetration and retraction is performed while traveling through the zone because it is at this time that the probe assembly matches the speed of the meat cut traveling along the dual belt conveyor. The probe should not be inserted or retracted just prior to or immediately after the constant speed zone during the deceleration zone 508 and the deceleration zone 504 respectively. Probe penetration and probe retracting should not be performed during either of the deceleration zones. The deceleration zones are due to the cam follower/connecting pin assembly's travel about the trolley chain sprockets.

Figure 6:
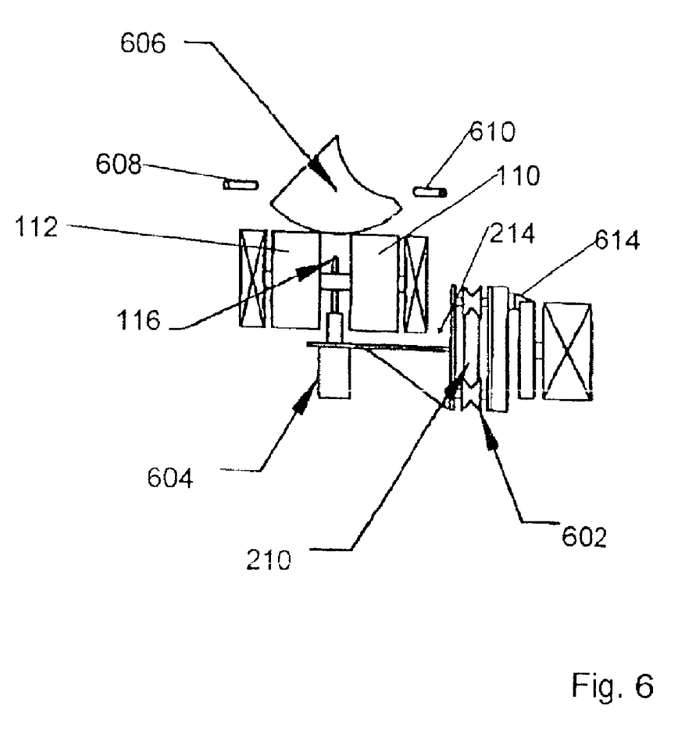
FIG. 6 is a side illustrative view of the split dual-belt conveyor and probe/trolley mechanism assembly.

Referring to FIG. 6, a side illustrative view of the split dual belt conveyor and probe/trolley mechanism assembly is shown. A meat cut 606 is illustrated as being conveyed on the split dual belt conveyor. First and second sensors 608 and 610 are illustrated along opposing sides of the conveyor that are positioned to sense the presence of a meat cut at various locations along the conveyance path. These sensors can be referred to as meat cut detection or meat cut present sensors. The sensors are adapted to provide a meat cut present control signal to a controller. The first and second dual belts 110 and 112 are shown conveying the meat cut 606. The probe 116 is shown extending upward through the gap between the first and second dual belts. The probe 116 can be actuated cylinder 604 to elevate the probe upward to press against the meat cut and penetrate through the layer of fat. The probe assembly 214 has a plurality of v wheels 602 mounted thereon by an axle assembly. The v wheels 602 travel along rail 210 thereby translating the probe assembly along the path of conveyance. The rail 210 extends parallel the path of conveyance. The probe assembly is attached to the trolley assembly by junction 614 which is a connection between a connection pin and bushing assembly and a connecting pin mounting plate attached to the trolley chain. This junction will be described further when discussing FIG. 9.

Figure 7:
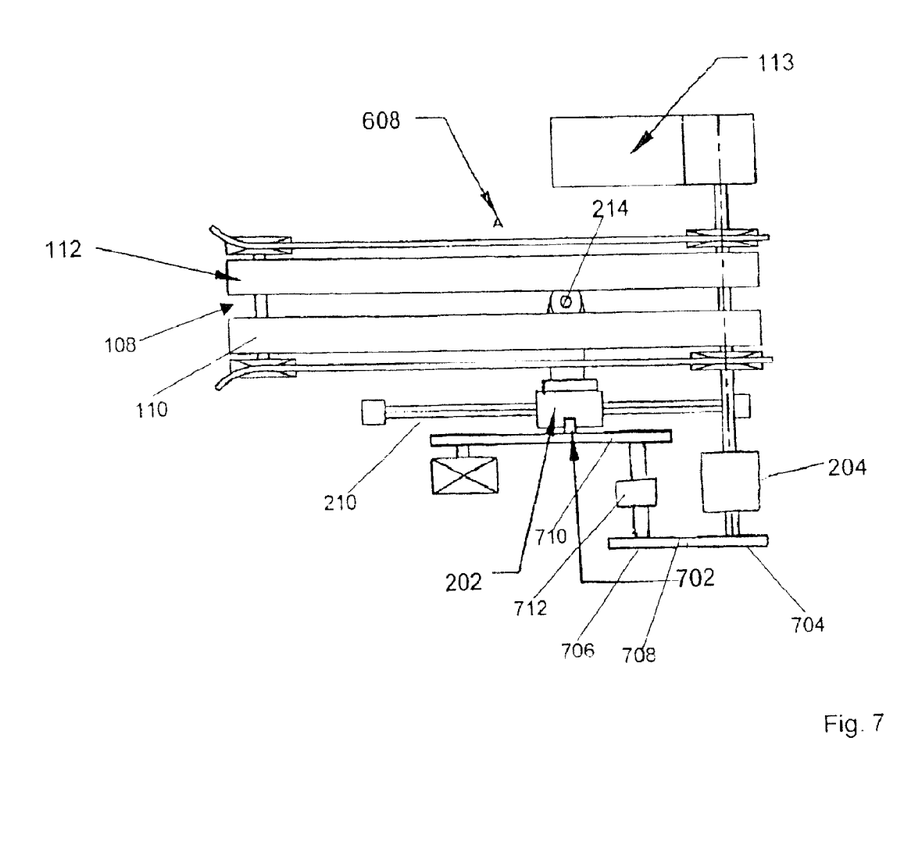
FIG. 7 is a top illustrative plan view of the split dual-belt conveyor and probe/trolley mechanism assembly.

Referring to FIG. 7, a top illustrative plan view of the split dual belt conveyor and probe/trolley mechanism assembly is shown. The motor function is illustrated as item 113 which powers the split dual belt conveyor 108 which comprises first and second dual belts 110 and 112. The dual belt conveys the meat cut along the path of conveyance defined by the orientation and direction of the parallel dual belts 110 and 112. A sensor 608 or meat cut detection sensor is illustrated which is operable to detect the presence of the front end of a meat cut traveling along the path of conveyance. When a meat cut is detected by the meat cut detection sensor the sensor is operable to transmit a meat cut present signal to a controller so that the clutch 204 can be engaged and thereby receiving power from motor 113. When the clutch 204 is engaged whereby pulley wheel 704 is powered thereby transferring power to pulley wheel 706 by way of pulley belt 708. Power is in turn transferred from pulley wheel 706 to pulley wheel or sprocket 710 by axle and bearing member 712. Pulley wheel or sprocket 710 powers the roller chain and thereby effects translation of the probe/trolley mechanism assembly 202. The probe/trolley mechanism assembly 202 is attached to the roller chain by a cam follower/connecting pin assembly 702. The roller chain effects translation of the probe/trolley mechanism assembly along the rail 210. The probe assembly 214 is shown with the probe positioned in the gap between the first and second dual belts 110 and 112. The v-rail 210 which defines the forward and reverse direction of translation for the probe/trolley mechanism assembly is parallel to dual belts and the direction of conveyance of the meat cut. This configuration allows the probe to travel in-line with the conveyance path of the meat cut.

Figure 8:
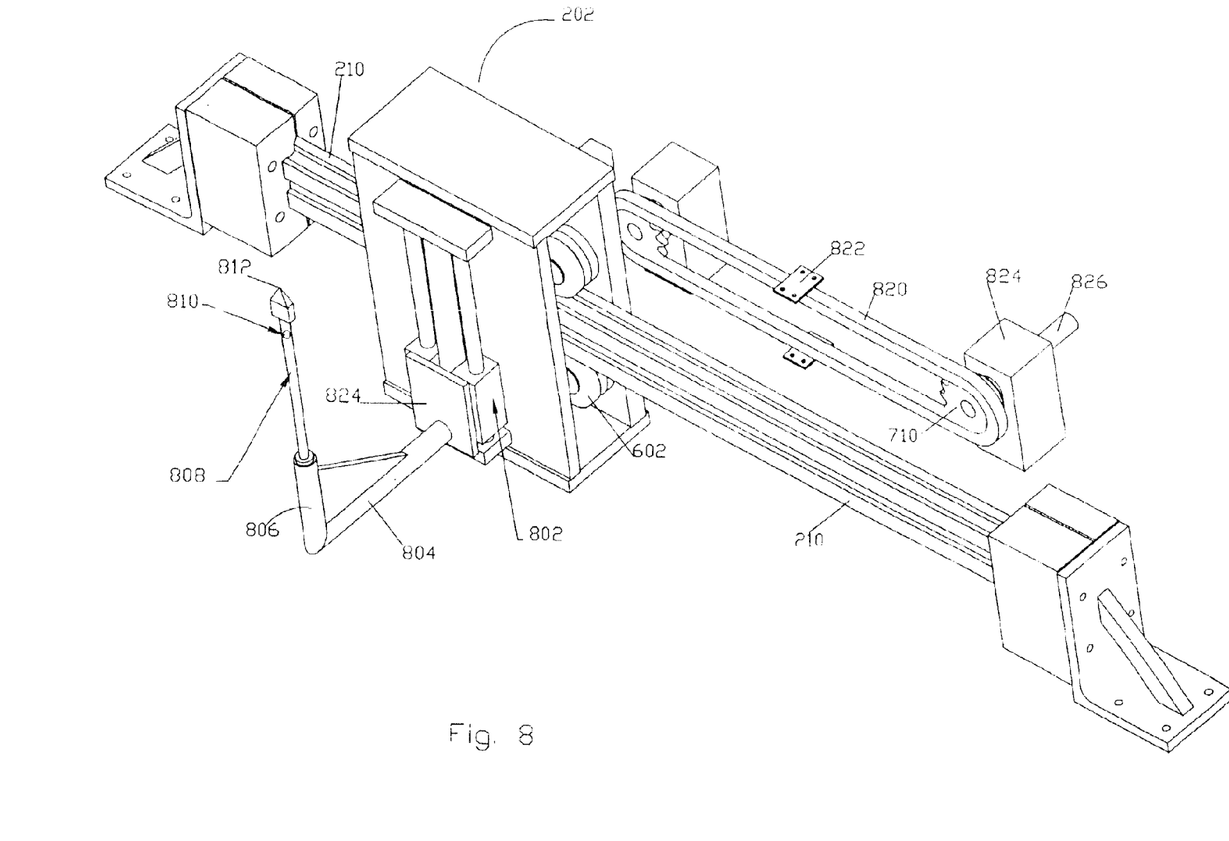
FIG. 8 is a right-front isometric view of the probe/trolley mechanism assembly showing the probe shaft.

Referring to FIG. 8, a right front isometric view of the probe/trolley mechanism assembly is shown having the probe shaft extending upward. For illustration purposes, the probe/trolley mechanism assembly 202 along with the rail 210 is shown separated from the trolley roller chain 820. However, in actual operation the probe/trolley mechanism assembly is operably attached to the trolley roller chain by the cam follower/connecting pin assembly. Drive shaft 826 is shown extending through bearing 824 to power the sprocket 710 and the trolley roller chain 820. The drive shaft is powered by drive the same as the drive that powers the conveyor. Power is applied to the drive shaft when the clutch is engaged as discussed above. A connecting pin mount 822 is attached to the trolley roller chain 820 which provides a mounting point for the cam follower/connecting pin assembly. It is this connection that effects the translation of the probe/trolley mechanism assembly 202 along rail 210 on v wheels 602. When the connecting pin travels along the top run of the roller chain the trolley translates in the direction of conveyance and reverses translation when traveling along the bottom run. When the connection pin is transitioning from the top run to the bottom run and vice versa the trolley is not traveling at a constant speed. However, when traveling along to top or lower run the translation speed is synchronized with the conveyance speed. A speed synchronization sensor can be utilized to sense when the trolley translation speed is synchronized to the conveyance speed which can be a speed sensor, or a position sensor that senses when the trolley is in the constant speed zone (upper run and lower run) or other appropriate sensor. The speed synchronization sensor can be operable to transmit to a controller a speed synchronization control signal. Synchronization of the trolley translation speed with the conveyance speed allows for continuous conveyance of the meat cut during probing.

Also shown is a probe shaft 808 mounted on a probe seat mount 806 where the probe shaft 808 extends vertically upward from a seat mount 806. The probe shaft has a window 810 through which an infrared emitter transmits an infrared signal and through which an infrared receiver receives back reflected infrared signals. The probe has a pointed end 812 that is sufficiently pointed to penetrate the meat cut when pressed against the meat cuts exterior. The probe seat mount 806 is mounted on bracket 804 which extends outward from the body of the probe/trolley mechanism assembly. The bracket 804 is attached to a cylinder plate 824 which in turn is attached to an encoded cylinder assembly 802. The encoded cylinder assembly effects movement of the probe up and down. The cylinder is encoded such that it monitors the position of the probe and reports the position data to the controller. The position of the probe can be correlated by the controller to the probe's sensing of the fat to lean transition or interface. This allows the controller to determine the fat thickness.

Figure 9:
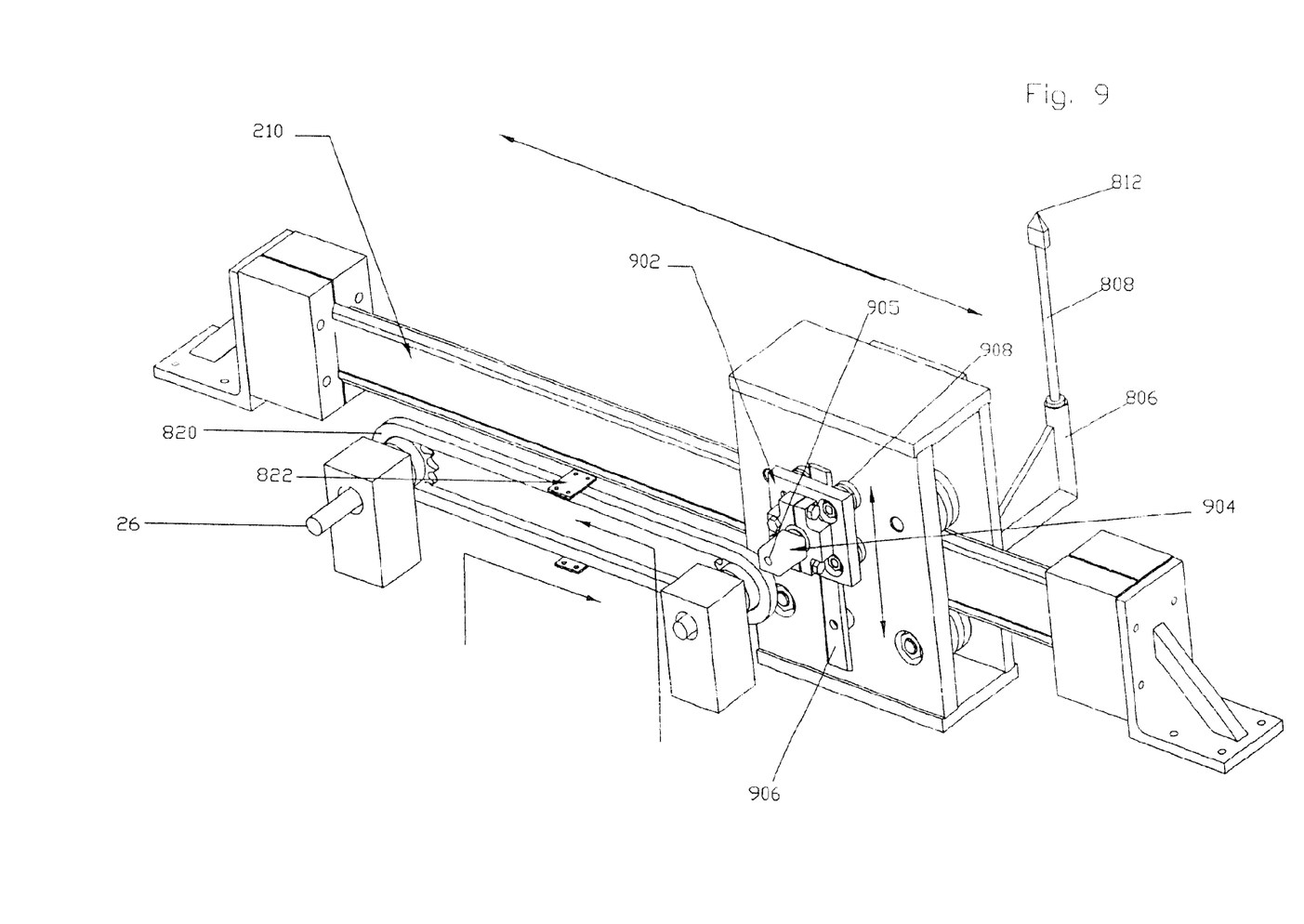
FIG. 9 is a left-rear isometric view of the probe/trolley mechanism assembly showing the Cam Follower and Roller Chain.

Referring to FIG. 9, a left rear isometric view of the probe/trolley mechanism assembly is shown. As shown by FIG. 8 drive shaft 826 drives trolley roller chain 820. The connecting pin mount 822 is again shown attached to the trolley roller chain 820. Again, for illustrative purposes, the connecting pin and bushing 904 is not shown attached to the connecting pin mount 822. However, under normal operation the connecting pin and bushing is attached to the connecting pin mount. The connecting pin 904 is rotatable about axle member 905. The axle member 905 attaches the connecting pin and bushing to the cam follower 902. The cam follower is slidably mounted on track rail 906 by v wheels 908. The track rail 906 is mountably attached to the trolley main body or housing. The cam follower 902 can slide vertically up and down along the vertical track rail 906 which allows the probe/trolley mechanism assembly to translate forward and backward along the rail 210 as powered by trolley roller chain 820. When the probe/trolley mechanism assembly is translating in the forward direction along rail 210 the cam follower is at its maximum vertical height such that the connecting pin and the portion of the roller chain to which it is attached is positioned above. When the probe/trolley mechanism assembly is traveling in the reverse direction the cam follower is at its minimum vertical height such that the connecting pin is below. This configuration makes it possible for the trolley to go back and forth as needed between the two chain sprockets. Also the trolley will move at a constant speed between the two chain sprockets and will decelerate and accelerate during the transition from the maximum vertical height of the cam follower to the minimum vertical height of the cam follower and vice versa. The deceleration is due to travel about the sprocket.

Figure 10:
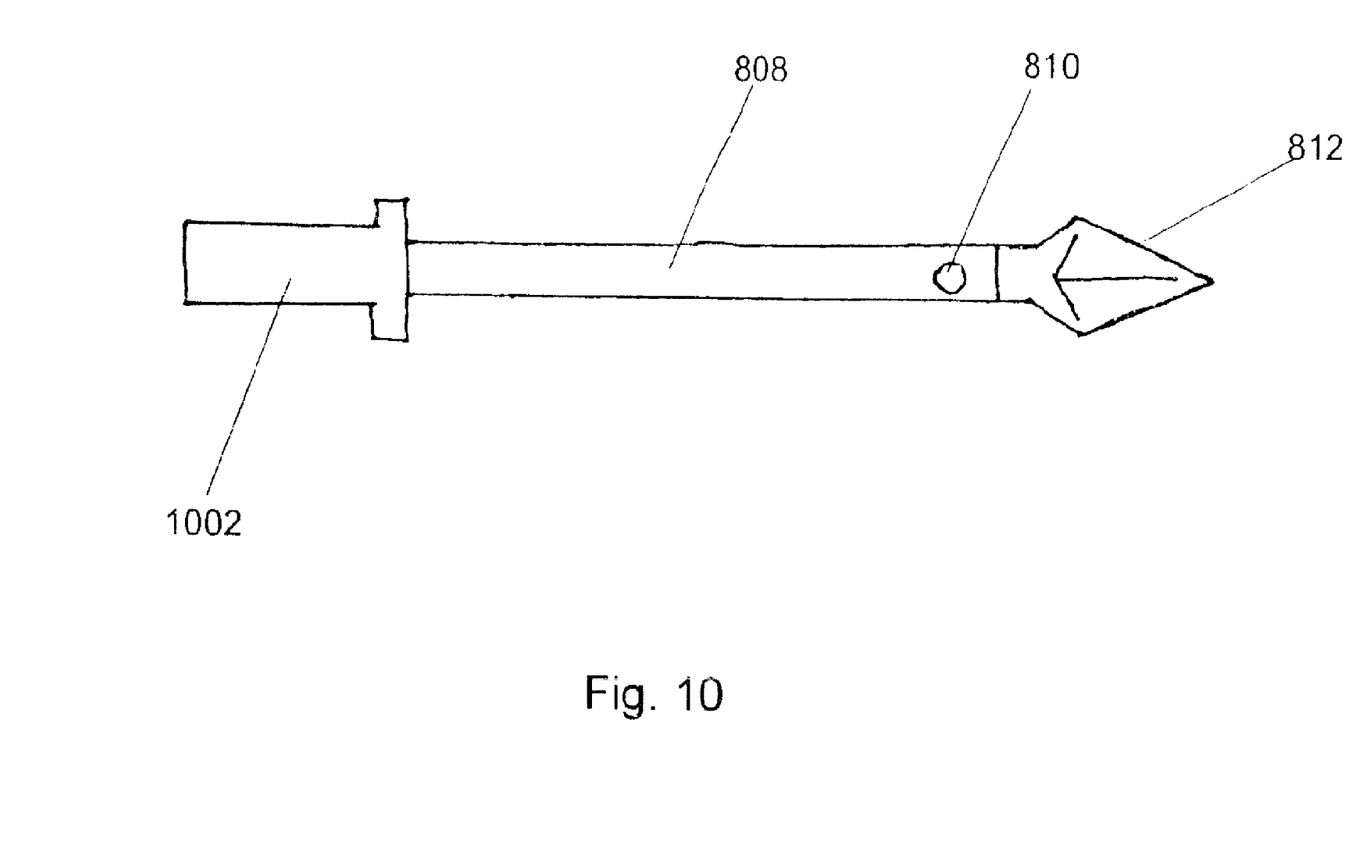
FIG. 10 is a sectional view of the probe assembly.

Referring to FIG. 10, a side view of the probe is shown. The probe comprises a probe shaft 808 having a window 810. The window 810 allows an infrared signal or other appropriate signal to be transmitted from an infrared transmitter or other appropriate signal emitter positioned adjacent the window in the interior of the probe shaft through the window to an area exterior the probe shaft. The window 810 also allows reflected infrared signals or other appropriate reflected signal to be transmitted back through the window to the interior of the probe to an infrared receiver or other appropriate signal receiver positioned adjacent the window. The probe also comprises a bushing 1002 which mounts into the probe seat mount. The probe also comprises a pointed end 812 which is sufficiently pointed to penetrate the meat cut when the probe is pressed against the exterior of the meat cut.

Figure 11:
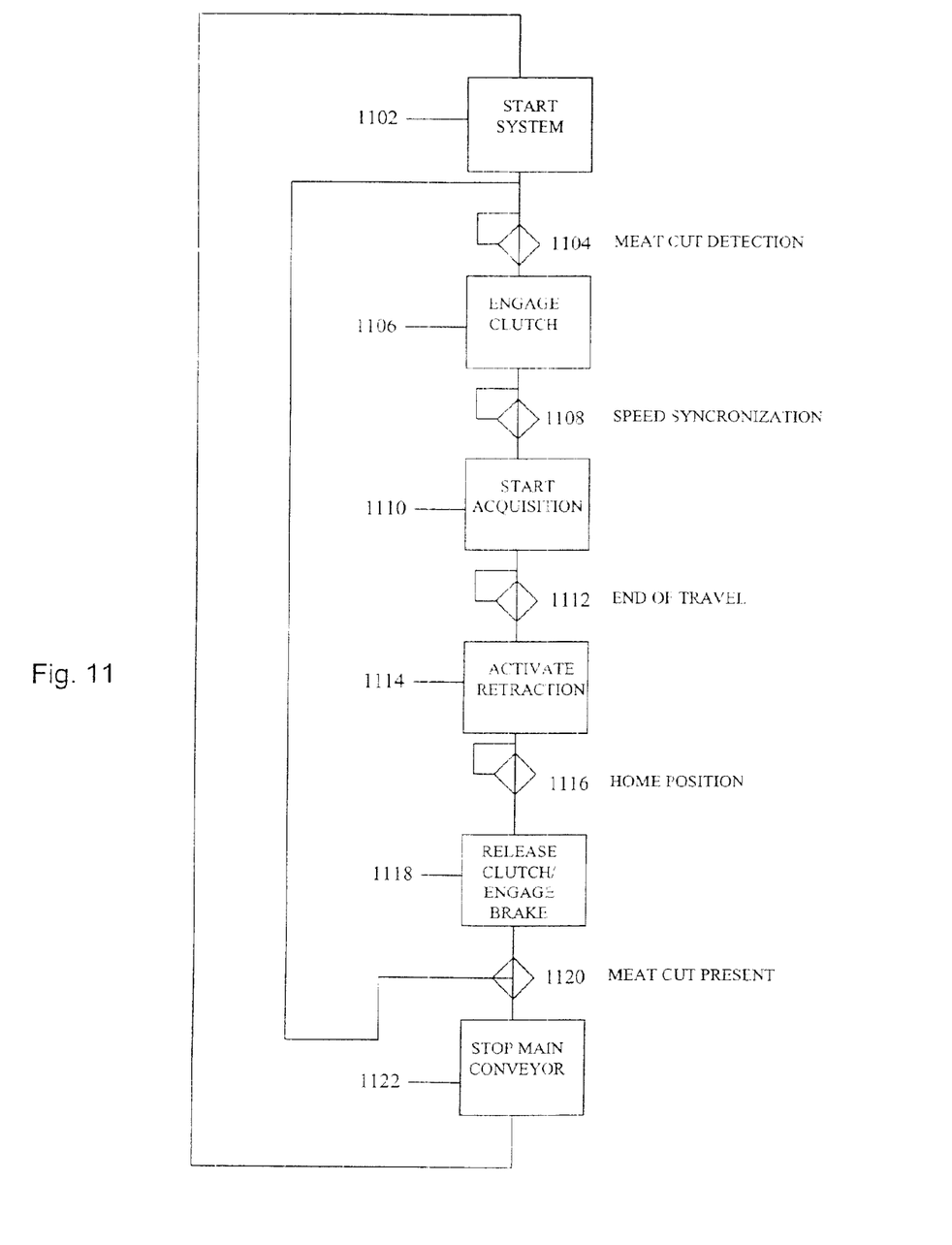
FIG. 11 is a flow diagram of the classification system operation.

Referring to FIG. 11, a flow diagram of the meat classification operation is shown. Functional block 1102 represents the system start function. The system can be started or initiated remotely or locally by simply providing an initiation signal to the controller. This can simply be performed by actuation of a button. Within this start functional block 1102, it is verified that the probe/trolley mechanism assembly is in its home position and that the probe is in its down or retracted position. It is also confirmed that the split dual belt conveyor is powered. Functional block 1104 is a decision functional block which checks the status of a sensor which detects the front end of a meat cut traveling along the conveyance path. If the sensor provides a positive indication for the presence of a meat cut on the conveyor the operation moves to functional block 1106. If a meat cut is not detected by the sensor then decision block 1104 will continue to monitor the sensor until a meat cut is detected. Functional block 1106 engages the clutch to power the trolley. Decision block 1108 checks to see if the trolley speed sensor indicates that the trolley is traveling at a speed synchronous with the conveyor speed (or at a constant speed or in the constant speed zone). If the sensor detects that the trolley is traveling at a constant speed or is in the constant speed zone the operation moves to functional block 1110. However, if constant speed is not detected functional block 1108 will continue to monitor the sensor until the sensor indicates that the trolley is at constant speed. Functional block 1110 starts the data acquisition sequence. Within this functional block the probe is actuated to penetrate the meat cut for determining the fat thickness. The probe will detect a transition from fat to lean by utilizing the infrared transmitter and receiver. The encoded cylinder will provide linear position data that reflects the height of the probe which can be correlated to the transition between fat and lean. This data can be gathered during the upward stroke of the probe and/or during the downward stroke of the probe. Decision block 1112 monitors a trolley end of travel sensor which detects the position of the trolley just prior to entering the deceleration zone. If the sensor provides an end of travel signal then the operation moves to functional block 1114. If an end of travel signal is not provided then decision block 1112 continues to monitor the sensor until an end of travel is detected. Functional block 1114 is representative of the function to activate retraction of the probe as the trolley approaches the end of the constant speed zone. During the data acquisition sequence starting with functional block 1110 and ending with functional block 1114, data is gathered by the probe to sense the transition from fat to lean.

Data can be gathered during penetration and during retraction of the probe. An infrared transmitter located in the interior of the probe shaft positioned adjacent a window in the probe shaft emits an infrared signal through the window to an area exterior the probe shaft. The infrared signal is reflected back off the meat surrounding the probe shaft window and enters the window to be received by an infrared receiver also interior the probe shaft positioned adjacent the window. The infrared receiver transmits a signal to a controller representative of the meat surrounding the window in the probe shaft. The infrared signal reflection will vary from fat to lean such that the transition from fat to lean can be detected as the probe is inserted and/or retracted. The vertical position of the probes encoder cylinder can be correlated by the controller with the data showing the transition from fat to lean. This correlation will allow the thickness of the fat layer to be determined by the controller and transmitted by the controller downstream to a fat trimming station or apparatus. Once the probe is retracted, the probe/trolley mechanism assembly is returned to its home position. Decision block 1116 is representative of the function of monitoring a sensor which detects when the probe/trolley mechanism assembly is in the home position. If the sensor detects that the assembly is in the home position then the operation transitions to functional block 1118. If the assembly is not detected decision block 1116 continues to monitor for the assembly returning to the home position at which time the operation transitions to functional block 1118. Functional block 1118 is representative of the function of releasing the clutch and thereby removing power to the trolley roller chain. Decision block 1120 looks for a stop signal indication such that if a stop signal is present the drive motor is halted thereby turning off the conveyor. If a stop signal is not present the operation returns to functional block 1104.

Figure 12:
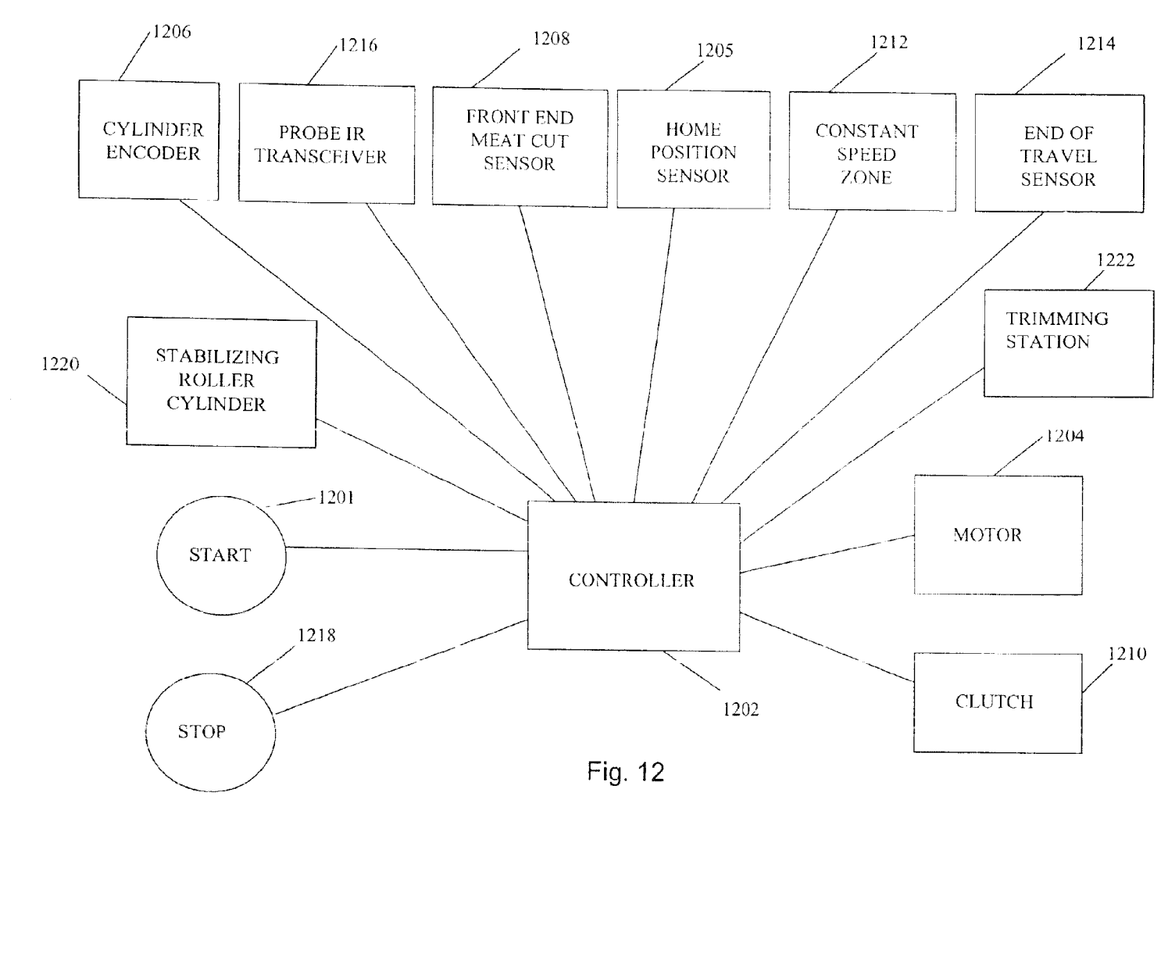
FIG. 12 is a diagram of the system controller.

Referring to FIG. 12, a system controller 1202 as shown is operatively connected to a start function 1201. When the controller receives a start signal from 1201 the controller 1202 activates a motor 1204 which provides power for the conveyor and the trolley mechanism. Once the motor 1204 has been activated the controller 1202 monitors the home position sensor 1205 to determine if the probe/trolley mechanism assembly is in the home position. If the assembly is detected at the home position but no meat cut is detected then the clutch function 1210 should be triggered to release the clutch. The controller also monitors the cylinder encoder 1206 to determine if the probe is in its retracted position. The controller will then monitor the speed synchronization sensor and a meat cut detection sensor 1208 operable to sense the front end of a meat cut traveling along the conveyor. When the front end of a meat cut is sensed by the meat cut detection signal sensor represented in functional block 1208, a front end meat cut sensor signal is sent to the controller which in turn activates the clutch 1210 in order to power the trolley. The controller will then monitor the constant speed zone sensor 1212 (or speed synchronization sensor) to determine when the trolley has entered the constant speed zone at which time the controller activates the cylinder encoder 1206 to elevate the probe. As the probe penetrates the meat, the probe IR receiver 1216 transmits IR signals to the controller which represents fat or lean as seen by the probe. The controller also monitors for an end of travel sensor 1214 signal indicating that the trolley is approaching the end of the constant speed zone at which time the controller will activate the cylinder encoder 1206 to retract the probe. The controller can optionally communicate with the stabilizing roller cylinder function 1220 in order to cause the stabilizer roller to lower applying pressure against the meat cut as the probe is being inserted. The controller also monitors for a stop signal from a stop function 1218.

The controller utilizes the data transmission from the encoded cylinder to determine the position of the probe. This position data allows the controller to determine the depth of penetration of the probe into the meat cut. This data is then correlated with the probe's IR receiver data which is used to determine the fat to lean transition or fat/lean interface. The correlation of the position data to the fat/lean interface data allows the controller to determine the thickness of the fat layer. The controller is further operable to transmit this fat thickness data to a fat trimming station 1222 so that the trimming means can be adjusted according to the fat layer thickness of the meat cut.

The various meat cut classification system embodiments and examples shown above illustrate an effective method and apparatus for meat cut classification based on thickness of the fat layer. A user of the present invention may choose any of the above meat classification system embodiments, or an equivalent thereof, depending upon the desired application. In this regard, it is recognized that various forms of the subject meat classification method and apparatus could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A meat cut classification system for determining the thickness of a layer of fat comprising:

a rail extending parallel to a conveyor said rail having a trolley mechanism operable to translate along said rail and said trolley having a probe extending vertically upward from said trolley;

a cam follower mechanism operatively attached between said trolley and a trolley roller chain where said roller chain has at least one sprocketed pulley axially attached to a drive shaft where said drive shaft is operatively connected to a conveyor drive by a clutch assembly where said clutch is operable to selectively transfer drive from the conveyor drive to the drive shaft for causing translation of said trolley along said rail; and said probe assembly having a cylinder adapted to elevate a probe upward transverse the direction of conveyance for probing a meat cut.

2. The meat cut classification system as recited in claim 1 where said probe further comprises:

a pointed end of the probe sufficiently pointed to penetrate a meat cut;

a signal emitter housed interior the probe and adjacent a window of the probe and operable to emit a signal through said window to a surrounding area exterior the probe; and a signal receiver housed interior the probe and adjacent the window and operable to receive a signal reflected back through the window and transmit a control signal representative of the reflected signal to a controller.

* * * * *